June 10, 1947.　　　　　L. B. TAYLOR　　　　　2,421,765
PORTABLE MULTIPLE COMPARTMENT LIQUID DISPENSING SYSTEM
Filed April 27, 1944　　　3 Sheets-Sheet 1
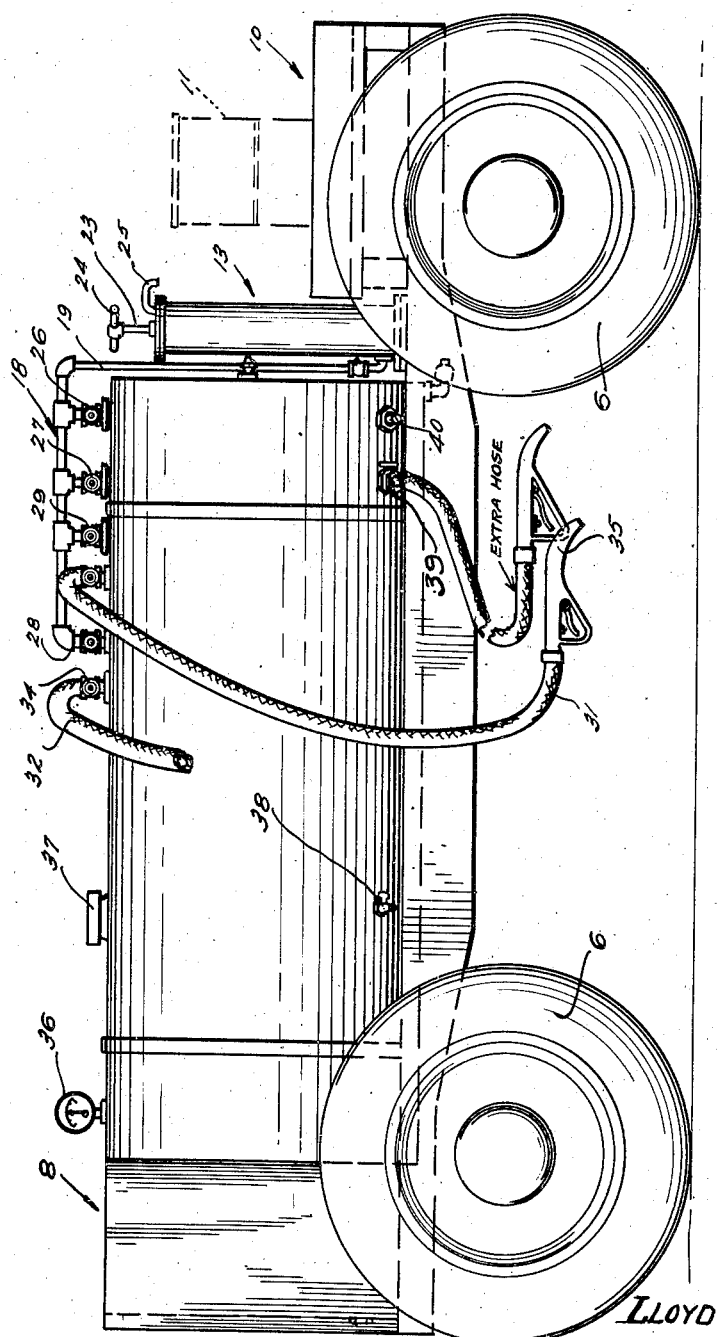
Inventor
LLOYD B. TAYLOR
By Clarence A. O'Brien
and Harvey B. Jacobson
Attorneys

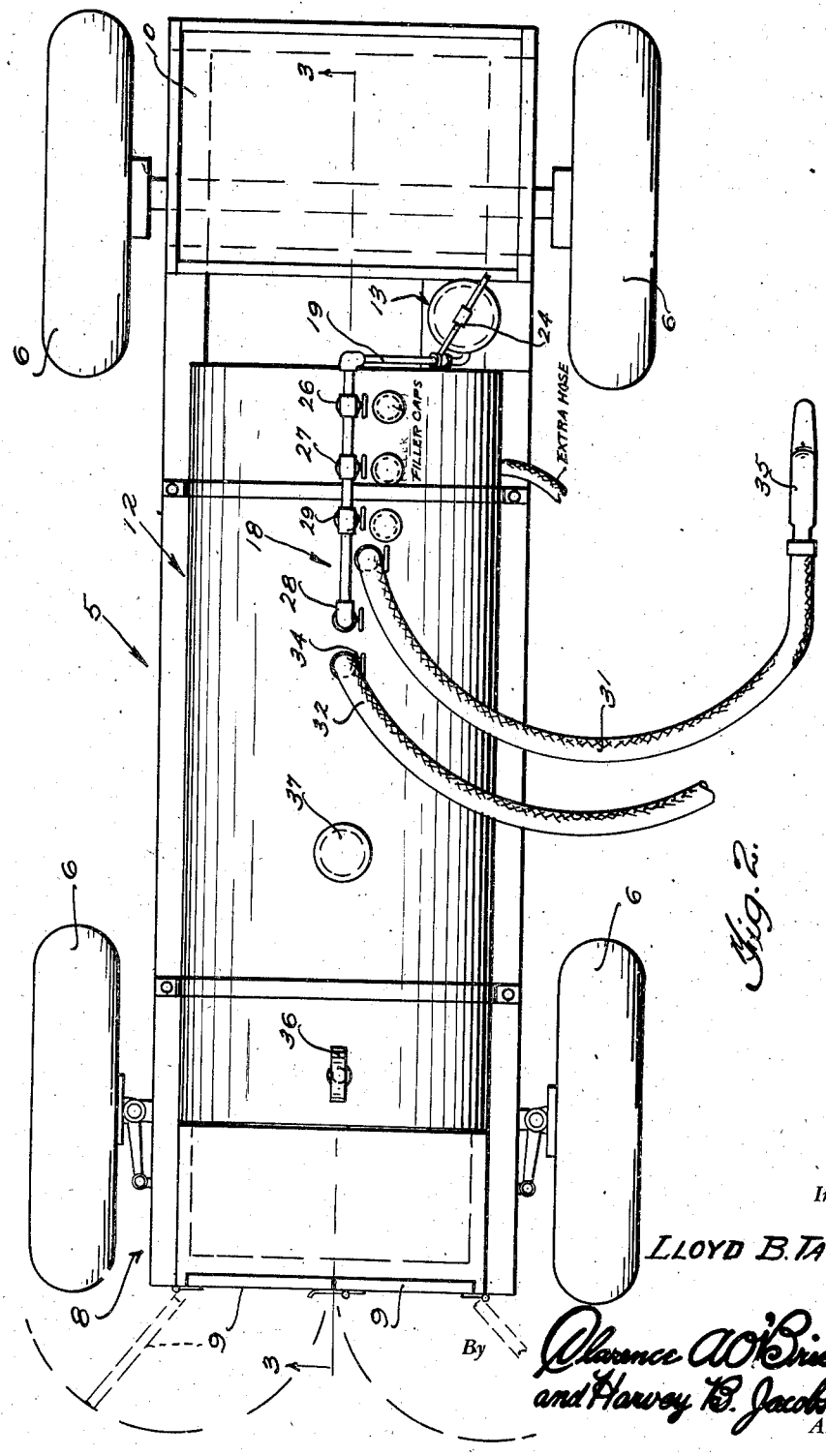

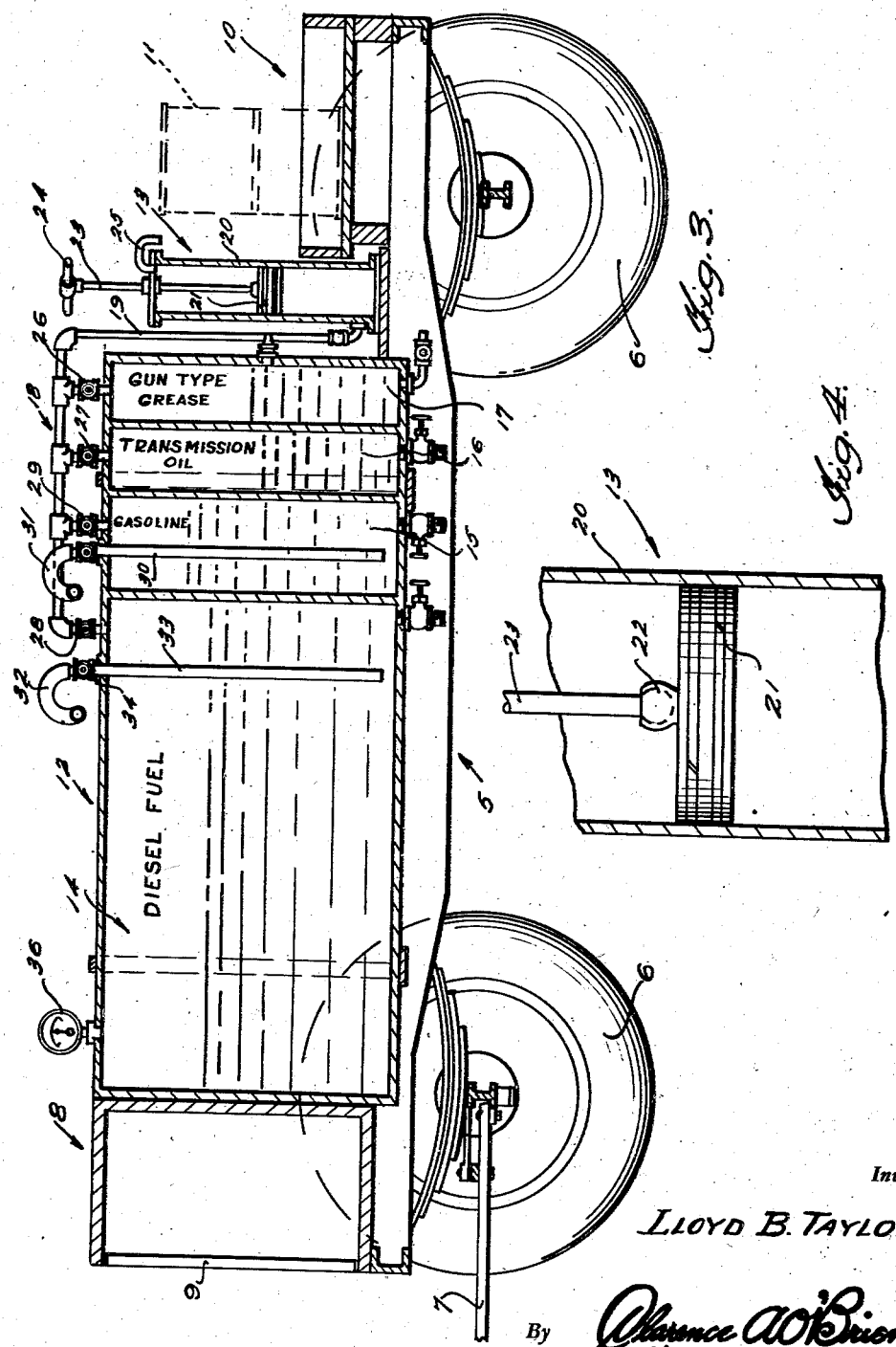

Patented June 10, 1947

2,421,765

UNITED STATES PATENT OFFICE 2,421,765

PORTABLE MULTIPLE COMPARTMENT LIQUID DISPENSING SYSTEM

Lloyd B. Taylor, Farmington, N. Mex.

Application April 27, 1944, Serial No. 533,068

1 Claim. (Cl. 222—135)

This invention relates to trailers and more particularly to a trailer which is adapted for draft connection with a conventional farm or industrial tractor, or other vehicle whereby to provide such "vehicles" with needed fuel and other miscellaneous supplies at virtually all times.

Many tractors nowadays are using Diesel fuel. However, and regardless of this, it has generally been the custom on farms, industrial and construction jobs, state and federal highways and so on to provide a special fuel and servicing truck, that is, an independent truck which is driven about from place to place to refuel tractors and to serve in various ways. My aim, instead of providing an independent truck, is to provide a trailer which is hitched to the tractor or car and which fulfills many requirements and serves a number of purposes in that it carries on board, a supply of Diesel fuel, a limited supply of gasoline, transmission oil, lubricating greases; and, in addition, includes other needed supplies and accessories, tools and equipment, whereby to have all of these handy at all times for immediate and convenient use by the operator of the tractor.

More specifically, novelty resides in a wheel supported chassis usable as a trailer unit and provided with a plurality of selectively usable accessories or devices, but primarily characterized by a tank partitioned into a series of compartments with Diesel fuel, gasoline and oil in these different compartments, there being an air pump, and a master manifold between the pump and the various compartments, whereby to utilize separate valved connections between the master manifold or duct and these compartments to dispense the particular product selected and required for use at the time.

Other features and advantages will become more readily apparent from the following description and the accompanying illustrative drawings.

In the drawings, wherein like numerals are employed to designate like parts throughout the same:

Figure 1 is a side elevational view of a multiple purpose utility type tank trailer constructed in accordance with the principles of the present invention.

Figure 2 is a top plan view of the assemblage seen in Figure 1.

Figure 3 is a longitudinal sectional view on the plane of the line 3—3 of Figure 2.

Figure 4 is a fragmentary detail section of a portion of the air pump.

Referring now to the drawings by distinguishing reference numerals, the chassis includes a suitable frame-work 5 with spring suspension devices and ground engaging and supporting tire equipped wheels 6. An appropriate draft-hitch 7 is at the frontal end for attachment to a conventional farm tractor or car (not shown). At the front end is a cabinet 8 with hinged doors 9 serving as a chest for tools, grease guns, and various accessories and equipment which would ordinarily be needed in the course of the average day's work on the farm, that is, where a tractor is employed. On the rear extended end of the frame of the chassis is a tray or so-called box-platform 10 which may also be used for carrying miscellaneous articles. I have simply shown an oil drum 11 seated therein, this to illustrate a point. The multiple purposed selectively usable compartment tank 12 is suitably supported on the frame and abuts the cabinet 8 at its front end. The rear end is spaced from the box 10, and in between the two, is an air pump 13, that is, a hand type air pump which is used for pressure purposes. The tank includes a compartment 14 for Diesel fuel, a separate compartment 15 for a limited supply of gasoline, another at 16 for transmission oil, and a fourth compartment 17 for heavy gun-type grease. There is a main air line or pipe at 18 which has a branch pipe connection at 19 with the air pump 13. The air pump is a hand-type pump similar to that used in inflating bicycle tires and the like. It includes a stationary cylinder 20 with a packing ring equipped plunger or piston head 21 with a socket 22 with which a ball joint element on the piston rod 23 has universal connection. The handle 24 atop the piston rod is more or less conventional. The numeral 25 designates an elbow vent and this is at the top while the air take-off pipe 19 connects with the bottom. I provide suitable valved by-pass connection between the main line 18 and the respective chambers. That is to say, there is a valved connection 26 leading to the grease compartment 17, a similar connection 27 leading to the oil compartment 16, and another connection 28 leading to the Diesel fuel chamber and another 29 to the auxiliary gasoline supply chamber 15. The elevating pipe 30 from the gasoline chamber leads from the bottom thereof through the top of the tank and is provided with a regulating valved fitting with which a dispensing hose 31 is connected. There is a similar hose 32 which is connected with the delivery pipe 33 in the Diesel fuel chamber by way of a valved connection 34. The discharge end of each hose is provided with an appropriate valve regulated nozzle arrangement 35 as shown in Figure 1.

The numeral 36 designates a gauge, 37 a filler neck for the main tank, 38 a petcock for washing filters, hands and the like. The numeral 39 is an outlet valve for transmission grease and oils and 40 is a grease gun joint affording communication with the gun type grease chamber 17.

This supply tank keeps the fuel absolutely clean and eliminates the use of barrels, buckets and other types of pumps for the dispensing of fuel to tractors etc. It is conveniently mounted on a trailer chassis and can be moved about the jobs behind a small car or by the tractor itself.

The tank, holding about 350 gallons, makes it suitable for servicing the ordinary tractor for a week or so with one filling.

The large capacity air pump is worked by hand just as an ordinary tire pump is used. About twenty strokes of the pump will fill a 55 gallon barrel. The pressure of the air on top of the fuel forces the fuel out of the outlet hose which is controlled by a regular gasoline hose nozzle. The air can be pumped into the tank any time during the day and the pressure is there at the end of the nozzle any time. The operator can refill his tractor without being on the tank at all and can control his fuel by the nozzle. Two to four pounds of air pressure is all that is required to force the fuel at a good pressure. Pressures as high as eight or ten pounds can be used but are not necessary. The pump works very easily up to eight pounds or so and is very efficient.

I desire to stress the multiple compartment tank construction and the single simple hand-type air pump having selectively usable valved connections with the various compartments in the tank. I mention too, the individual hoses and their respective nozzles for the Diesel fuel tank on the one hand and the auxiliary gasoline supply on the other. The tray type platform on the rear serves not only for carrying grease drums and repair equipment but has many other miscellaneous uses as obviously come into play in connection with tractor farming and industrial and construction work.

It is understood that I am not particularly concerned with the exact construction of the chassis or wheel foundation structure. In other words, any type of a portable structure, which would include any sled or wheel supported mounting would fall within the purview of the invention. Different types of pumps, so long as they serve the purposes intended may be resorted to and used in actual practice. This is also true to valves, pipes and fittings in that they may vary according to manufacturing and trade requirements.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A servicing trailer for tractors and the like including a portable tank divided into at least two liquid containing compartments, liquid delivery pipes extending through the top wall of at least two such compartments and extending into each such compartment to a point near the bottom wall thereof, a shut-off valve near the upper end of each delivery pipe, a dispensing hose attached to each delivery pipe beyond its respective shut-off valve, each compartment having a filling opening in its top wall, removable filler caps sealing each filling opening, an air supply pipe disposed above the tank and having a branch pipe leading into the top of each compartment, a shut-off valve in each branch pipe, a pump adjacent the tank and a pipe connecting the pressure end of the pump with the air supply pipe whereby air may be injected into the compartments above the contents thereof and a pressure head built up therein for forcing the contents of the compartments out through a dispensing hose when the valve in its respective discharge pipe is opened.

LLOYD B. TAYLOR.

REFERENCES CITED

The following references are of record in the file of this patent:

UNITED STATES PATENTS

| Number | Name | Date |
|---|---|---|
| 731,918 | Landers | June 23, 1903 |
| 864,784 | Hanitzsch | Sept. 3, 1907 |
| 912,603 | Nester | Feb. 16, 1909 |
| 1,696,954 | Hayes | Jan. 1, 1929 |
| 1,737,929 | Libby | Dec. 3, 1929 |
| 1,989,940 | McGaughan et al. | Feb. 5, 1935 |
| 2,185,030 | Lockwood | Dec. 26, 1939 |
| 344,932 | Backus | July 6, 1886 |
| 1,897,161 | Endacott | Feb. 14, 1933 |
| 2,063,727 | Davis | Dec. 8, 1936 |
| 1,884,673 | Hayes | Oct. 25, 1932 |
| 939,596 | Grant | Nov. 9, 1909 |

FOREIGN PATENTS

| Number | Country | Date |
|---|---|---|
| 15,080 | Great Britain | June 23, 1914 |
| 2,901 | Great Britain | Nov. 19, 1861 |